United States Patent [19]
Birchler et al.

[11] Patent Number: 5,440,590
[45] Date of Patent: Aug. 8, 1995

[54] METHOD AND APPARATUS FOR PRODUCING A USABLE SIGNAL FROM RECEIVED DIVERSE MODULATED SIGNALS

[75] Inventors: Mark A. Birchler, Roselle; Steven C. Jasper, Hoffman Estates; Karen A. Brailean, Chicago; Timothy J. Wilson, Schaumburg, all of Ill.

[73] Assignee: Motorola, Inc., Schaumburg, Ill.

[21] Appl. No.: 143,589

[22] Filed: Nov. 1, 1993

[51] Int. Cl.⁶ .......................... H04B 7/10; H04L 1/02
[52] U.S. Cl. .................................. 375/347; 375/227; 375/267; 455/135; 455/277.2
[58] Field of Search ................. 375/100, 102, 10, 40, 375/224, 227, 267, 346, 347, 349; 455/13.3, 132, 135, 133, 137, 277.1, 277.2, 296, 303

[56] References Cited
U.S. PATENT DOCUMENTS

| | | | |
|---|---|---|---|
| 4,035,729 | 7/1977 | Perry | 455/135 |
| 4,246,655 | 1/1981 | Parker | 455/135 |
| 4,835,790 | 5/1989 | Yashida et al. | 375/10 |
| 5,065,449 | 11/1991 | Gordon et al. | 445/277.2 X |
| 5,127,025 | 6/1992 | Okanoue | 375/100 |
| 5,164,964 | 11/1992 | Kuko | 375/100 |
| 5,291,519 | 3/1994 | Tsurumaru | 375/100 |

OTHER PUBLICATIONS

Yamao, Yasushi and Nagao, Yoshinori, "Predictive Antenna Selection Diversity (PASD) For TDMA Mobile Radio", 1991 IEEE International Conference on Communications, vol. 46, Mar. 1991, pp. 1480–1484.

Akaiwa, Yoshihiko, "Antenna Selection Diversity For Framed Digital Signal Transmission in Mobile Radio Channel", 1989 IEEE Vehicular Technology Conference, Jan. 1989, pp. 470–473.

*Primary Examiner*—Stephen Chin
*Assistant Examiner*—Amanda T. Le
*Attorney, Agent, or Firm*—Daniel C. Crilly; James A. Coffing

[57] ABSTRACT

A diversity receiver that receives diverse modulated signals may produce a usable signal from the received modulated signals in the following manner. Two modulated signals, each including a desired component and an undesired component, are received by the diversity receiver, wherein each desired component includes an originally transmitted signal and each undesired component includes noise and interference. The diversity receiver estimates each desired and undesired component and produces the usable signal based on the estimated desired components and the estimated undesired components.

7 Claims, 2 Drawing Sheets

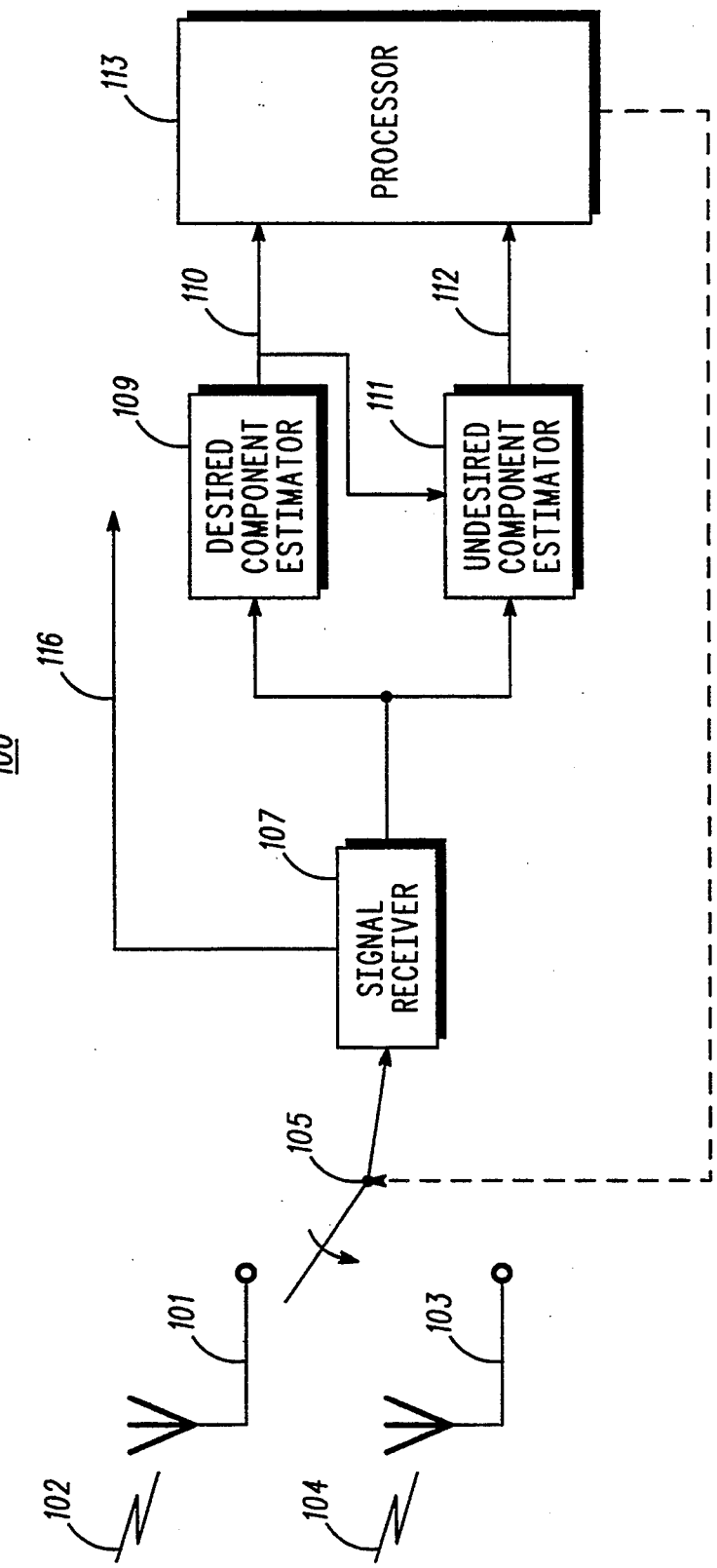

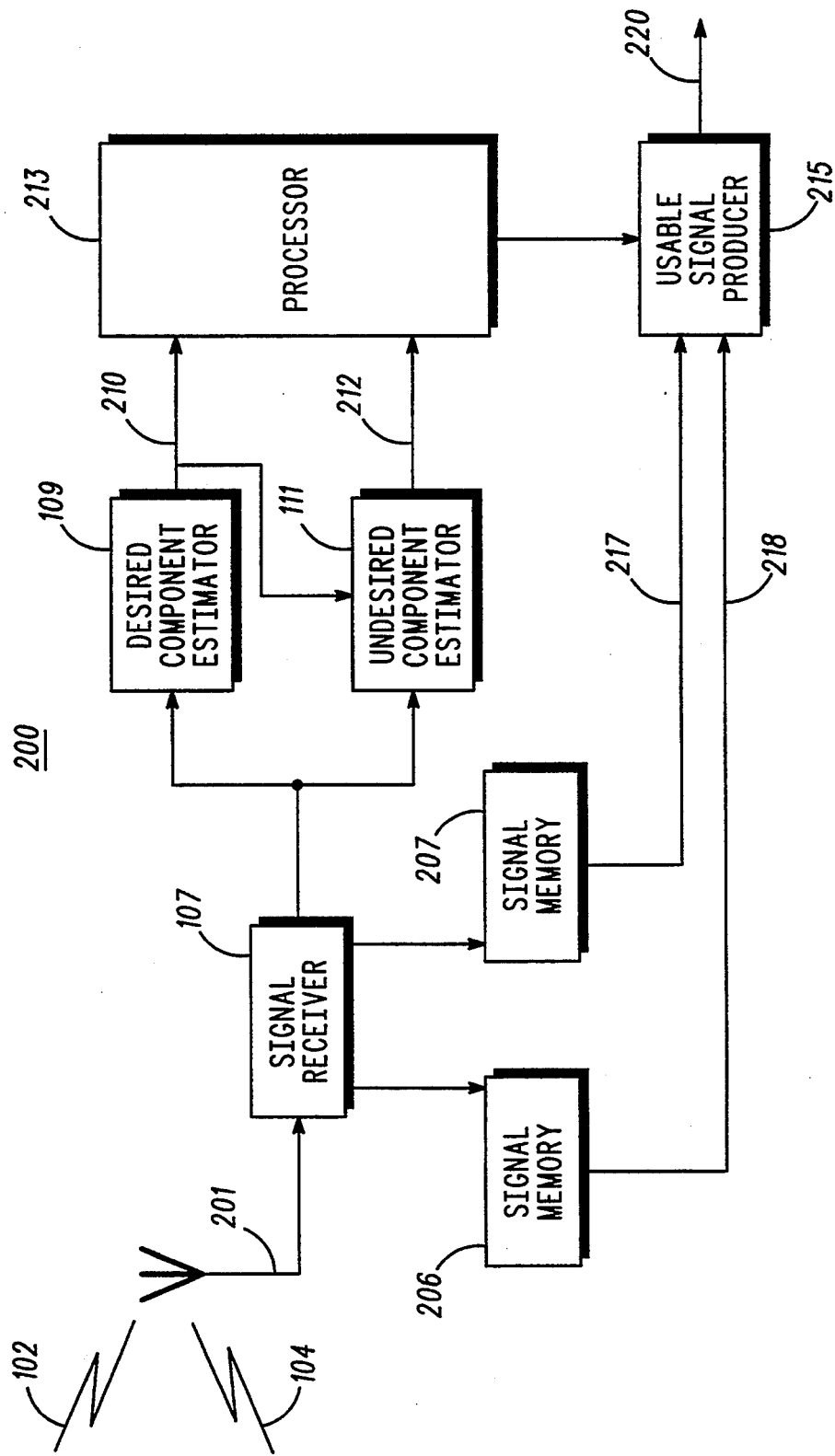

METHOD AND APPARATUS FOR PRODUCING A USABLE SIGNAL FROM RECEIVED DIVERSE MODULATED SIGNALS

FIELD OF THE INVENTION

The invention relates generally to radio communication systems and, in particular, to a radio communication system that utilizes diversity receivers.

BACKGROUND OF THE INVENTION

Communication systems that geographically reuse communication resources are known. These systems allocate a predetermined set of communication resources in one geographic area and reuse the same set of communication resources in one or more other geographic areas. This reuse technique improves communication system capacity by minimizing the number of communication resources necessary to provide communication service in a large geographic area comprised of several smaller geographic areas. As is also known, communication resources are defined by the multiplexing scheme utilized in the particular communication system. For example, with frequency division multiplexing (FDM), a communication resource may be a frequency carrier or pair of frequency carriers; whereas, with time division multiplexing (TDM), a communication resource may be a time slot, or pair of time slots, in one or more time frames.

In geographic reuse communication systems, signal usability of a communication resource needs to be determined in order to reliably use the communication resource. The signal usability of a communication resource provides an indication of the corruption on that communication resource due to interference and noise present on a radio frequency (RF) channel. The RF channel provides a medium through which the communication resource is transceived by a communication unit or base station. Thus, signal usability is typically limited by the quantity of co-channel interference and noise present on the RF channel. Co-channel interference occurs when receivers receive unwanted information signals from neighboring communication units, or base stations, transmitting on the same channel as the desired RF channel. Noise occurs due to various phenomena, such as thermal noise from resistors within a receiver, shot noise from automobile alternators, and background noise from atmospheric sources.

Another alteration of a transmitted signal occurs as a result of fading. Fading occurs due to multiple reflections of the modulated signal during transmission over the RF channel. These reflections typically result from unintentional reflecting of the modulated signal from obstacles in its path, such as walls, automobiles, and buildings, and may produce multiple modified replications of the modulated signal, each introducing various amplitude and phase alterations of the original signal in each new signal path. All of the modulated signal replicas form a composite signal at the input to a receiver and account for the fading.

In order to mitigate the effects of fading, radio communication systems typically utilize diversity to enhance the signal-to-noise ratio of the modulated signal in a fading environment. Diversity techniques are incorporated in communication receivers and attempt to obtain multiple, decorrelated replicas of the transmitted signal by either using multiple antennas typically spaced several wavelengths apart or receiving redundant transmissions at predetermined time intervals. Thus, by receiving multiple copies of the transmitted signal, the diversity receiver produces an output signal with a better overall signal-to-noise ratio than if only one copy of the transmitted signal were received.

Although a variety of diversity techniques exist, two of the most common types are switched-branch diversity and time diversity. Switched-branch diversity is a technique typically used in a communication unit's receiver, wherein two receive antennas are separated in space by at least one quarter of a wavelength and are used to receive decorrelated replicas of a transmitted signal. An antenna switch in the communication unit enables the receiver to sequentially sample the signal received from each antenna. Each sampled signal is analyzed by the receiver to determine which is more preferable. Upon selecting the more preferable signal, the receiver directs the antenna switch to access the antenna which provided the more preferable signal. The receiver then continues to receive the transmitted signal using the selected antenna. The signal received from both antennas is periodically sampled and analyzed to insure continued use of the better signal.

A common method for choosing the preferred signal is to measure a received signal strength indication (RSSI) of the signal received from each antenna. The RSSI contains the sum of the transmitted signal and the co-channel interference plus noise on the RF channel over which the transmitted signal propagated. With the RSSI method, the antenna that produces the signal with the larger RSSI is subsequently selected. Since the RSSI comprises a summation of the desired signal and interference, a large RSSI may be obtained when an excessive level of co-channel interference and noise exists on the RF channel as compared to the level of the originally transmitted signal. In this case, the usability of the received signal is poor although the RSSI is large. Therefore, an RSSI fails to provide an accurate indication of a received signal's usability since it does not isolate the desired signal from the co-channel interference and noise. Further, the RSSI may be significantly impacted by the gain of each receiving antenna. Thus, the larger RSSI may be produced from the signal received by the higher gain antenna although it may not necessarily be the signal having the better signal usability.

The second diversity technique, time diversity, may be used by a receiver in either a communication unit or a base station. Time diversity only necessitates one antenna, but requires the same information to be transmitted at two different times. The receiver independently receives each transmission and determines respective RSSIs. Each signal is subsequently weighted based on its respective RSSI, with a higher weighting given to the signal with the larger RSSI. The weighting may include attenuating, or even eliminating, one of the received signals. The two weighted signals are then combined to provide a composite signal with an improved overall signal-to-noise ratio. However, by utilizing RSSI to weight the two received signals, a signal with an excessive level of co-channel interference and noise may be weighted higher and subsequently degrade the composite signal's signal-to-noise ratio.

Therefore, a need exists for a method and apparatus that produce a usable signal from modulated signals received by a diversity receiver based on an estimation of RF channel interference. Further, a diversity system that does not rely on an RSSI would be an improvement over the prior art.

BRIEF DESCRIPTION OF THE DRAWINGS

FIG. 1 illustrates a diversity receiver, in accordance with the present invention.

FIG. 2 illustrates an alternative diversity receiver, in accordance with the present invention.

DESCRIPTION OF A PREFERRED EMBODIMENT

Generally, the present invention provides a method and apparatus for producing a usable signal from diverse modulated signals received by a diversity receiver. This is accomplished by receiving two modulated signals, wherein each modulated signal includes a desired component and an undesired component. Each desired component includes an originally transmitted signal and each undesired component includes noise and interference. The diversity receiver estimates each desired and undesired component and produces the usable signal based on the estimated desired components and the estimated undesired components. Thus, by producing the usable signal in this manner, the diversity receiver continuously provides a more usable signal than those provided by prior art methodologies.

The present invention can be more fully described with reference to FIGS. 1 and 2. FIG. 1 illustrates a diversity receiver 100 that includes a first antenna 101, a second antenna 103, switching means 105 for switching between the first and second antennas 101, 103, a signal receiver 107, a desired component estimator 109, an undesired component estimator 111, and a processor 113. The switching means 105 may comprise a controlled coaxial switch. The signal receiver 107 includes known receiver front-end circuitry such as filters, frequency down-converters, and analog-to-digital converters (A/Ds). The processor 113 is preferably a microprocessor, a digital signal processor (DSP), or an application specific integrated circuit (ASIC) with processing capability. A detailed discussion of the desired and undesired component estimators 109, 111 is provided below. Note that although the following discussion addresses a diversity receiver 100 with two antennas, the discussion is directly applicable to diversity receivers with more than two antennas.

To facilitate a discussion of the operation of the diversity receiver 100 and an implementation of the present invention, it is assumed that a first modulated signal 102 is received by the first antenna 101. The first modulated signal 102 preferably comprises a quadrature amplitude modulated (QAM) signal; however, it may alternately comprise any analog or digitally modulated signal, such as a frequency modulated (FM) signal or a quaternary phase shift keying (QPSK) modulated signal. The first modulated signal 102 includes an originally transmitted information signal plus undesired effects and fading of the radio frequency (RF) channel over which the first modulated signal 102 was transmitted. These undesired effects include interference and noise.

Upon reception of the first modulated signal 102, via the first antenna 101, the first modulated signal 102 is processed by the signal receiver 107 which provides a digital baseband representation of the first modulated signal 102 to the desired and undesired component estimators 109, 111. The desired and undesired component estimators 109 and 111, respectively, estimate the desired and undesired components of the first modulated signal 102. As briefly noted above, the desired component of the first modulated signal 102 (i.e., $C_1$) includes a faded replica of the originally transmitted information signal and the undesired component of the first modulated signal 102 (i.e., $I_1$) includes the noise and interference which has also been subjected to fading. The desired and undesired component estimators 109, 111 provide their respective estimates 110, 112 to the processor 113, which in turn calculates a first ratio based on the estimates 110, 112 to identify the signal usability of the first modulated signal 102. Provided the estimates 110, 112 are accurate, the first ratio approximates the ratio of the first desired component to the first undesired component ($C_1/I_1$).

Upon obtaining the first ratio, the processor 113 delivers a switch control signal to the switching means 105, which subsequently switches the input of the signal receiver 107 from the first antenna 101 to the second antenna 103. The second antenna 103 is spatially separated from the first antenna 101 and receives a second modulated signal 104. The second modulated signal 104 is substantially identical to the first modulated signal 102, except that the fading encountered by the second modulated signal 104 during transmission over its RF channel is typically different than the fading encountered by the first modulated signal 102 during transmission over its RF channel.

Upon reception of the second modulated signal 104, via the second antenna 103, the second modulated signal 104 is processed by the diversity receiver 100 in a manner similar to the processing of the first modulated signal 102 to produce a second ratio based on estimates 110, 112 of the second modulated signal's desired and undesired components. Provided the estimates 110, 112 are accurate, the second ratio approximates the ratio of the second desired component to the second undesired component ($C_2/I_2$). Since the fading encountered by the second modulated signal 104 is generally different than the fading encountered by the first modulated signal 102, the second ratio is most often unequivalent to the first ratio.

Upon determining both ratios (i.e., $C_1/I_1$ and $C_2/I_2$), the processor identifies which of the modulated signals 102, 104 has the higher ratio, and directs the switching means 105 to switch to the antenna corresponding to the signal having this higher ratio. That is, when the first ratio is higher, the switching means 105 switches to the first antenna 101 and the first modulated signal 102 is provided to the signal receiver 107, where it might be further processed as a usable signal 116. Similarly, when the second ratio is higher, the switching means 105 maintains connection with the second antenna 103 and the second modulated signal 104 is provided to the signal receiver 107, where it might be further processed as the usable signal 116. Note that in the preferred embodiment, the first and second modulated signals 102, 104 reside in portions of time division multiple access (TDMA) time slots and are evaluated prior to transmission of an actual communication. Thus, the switching between antennas does not disrupt the communication.

In an alternative format, the diversity receiver 100 continually, or periodically, monitors the signal usability of the first modulated signal 102 based on the first ratio. In this case, switching from the first antenna 101 to the second antenna 103 only occurs after the the first ratio has decreased below a predetermined threshold (e.g., $C/I=20$ or $(C/I)_{dB}=13$ dB). Similarly, after switching to the second antenna 103, the diversity receiver 100 may continually, or periodically, monitor the signal usability of the second modulated signal 104 based on the second ratio. In this case, switching from the second antenna 103 to the first antenna 101 only occurs after the the second ratio has decreased below the predetermined threshold.

Regardless of how the usable signal 116 is produced, the desired and undesired components of each modulated signal 102, 104 are estimated via the desired and undesired component estimators 109, 111, respectively. As described above, the first desired component includes a faded replica of an originally transmitted information signal. Thus, the first desired component comprises a first information portion and a first fading portion. In a preferred embodiment, the desired component estimator 109 estimates the first information portion and the first fading portion. Upon obtaining these estimates, the desired component estimator 109 multiplies the estimated first fading portion by the estimated first information portion to produce the first desired component estimate 110. In an alternate embodiment, the desired component estimator 109 may average a magnitude squared of the computed product to form the first desired component estimate 110. Similarly, the second desired component includes an alternately faded replica of the originally transmitted information signal. Thus, the second desired component comprises a second information portion and a second fading portion. In the preferred embodiment, the desired component estimator 109 estimates the second information portion and the second fading portion. Upon obtaining these estimates, the desired component estimator 109 multiplies the estimated second fading portion by the estimated second information portion to produce the second desired component estimate 110. In an alternate embodiment, the desired component estimator 109 may average a magnitude squared of the second computed product to form the second desired component estimate 110.

Upon Obtaining the first and second desired component estimates 110, the diversity receiver 100 determines the first and second undesired component estimates 112. As described above, the first and second undesired components include a summation of interference and noise from the RF channel. Thus, the first undesired component comprises a first interference portion summed with a first noise portion; whereas, the second undesired component comprises a second interference portion summed with a second noise portion. To estimate the first undesired component in the preferred embodiment, the undesired component estimator 111 subtracts the first desired component estimate 110 from the received output of the signal receiver 107. The result of this subtraction provides the first undesired component estimate 112. Similarly, the undesired component estimator 111 subtracts the second desired component estimate 110 from the received output of the signal receiver 107 to produce the second undesired component estimate 112. In an alternate embodiment, the undesired component estimator 110 may further average the norm of either subtraction to produce each respective undesired component estimate 112. For a detailed discussion of the preferred method for determining each modulated signal's desired component estimate 110 and undesired component estimate 112 refer to pending U.S. patent application Ser. No. 08/069,927, entitled "A Method And Apparatus For Determining Signal Usability", and assigned to Motorola Inc.

By producing the usable signal 116 via the method of the present invention, a distinct improvement over usable signal production in prior art diversity receivers is apparent. This improvement is based on the present invention's ability to provide a true indication of each received modulated signal's signal usability by selectively separating their desired and undesired components. In contrast, prior art diversity receivers attempt to determine their received signal's usability by evaluating a summation of the received signal's desired and undesired components. Thus, in situations where the received signal's undesired component significantly impacts the summation, a poor signal usability exists, but is not detectable with the prior art methodology.

FIG. 2 illustrates an alternative diversity receiver 200 that includes an antenna 201, the signal receiver 107, signal memory devices 206–207, the desired component estimator 109, the undesired component estimator 111, a processor 213, and a usable signal producer 215. The signal memory devices 206–207 may comprise random access memories (RAMs), read only memories (ROMs), or any other equivalent electronic storage devices. Similar to the processor 113 of FIG. 1, the processor 213 is preferably a microprocessor, DSP, or an ASIC with processing capability.

To facilitate a discussion of the operation of the alternative diversity receiver 200, it is assumed that a first modulated signal 102 is received by the antenna 201. The first modulated signal 102 is processed by the signal receiver 107 which provides a digital baseband representation of it to a signal memory 206 and the desired and undesired component estimators 109, 111. The signal memory 206 stores the digital baseband representation of the first modulated signal 102. The desired and undesired component estimators 109 and 111, respectively, estimate the desired and undesired components of the first modulated signal 102 as discussed with reference to FIG. 1. The desired and undesired component estimators 109, 111 provide their respective estimates 210, 212 to the processor 213, which in turn calculates a first ratio based on the estimates 210, 212 to identify the signal usability of the first modulated signal 102. Provided the estimates 210, 212 are accurate, the first ratio approximates the ratio of the first desired component to the first undesired component (i.e., $C_1/I_1$).

After a predetermined amount of time, for example 200 milliseconds, a time diverse second modulated signal 104 is received by the antenna 201. The second modulated signal 104 is a substantially identical replica of the first modulated signal 102 except that the second modulated signal 104 encounters different fading than the first modulated signal 102 due to the transmission time lag.

Similar to the processing of the first modulated signal 102, the second modulated signal 104 is processed by the signal receiver 107 which provides a digital baseband representation of it to a signal memory 207, and the desired and undesired component estimators 109, 111. The signal memory 207 stores the digital baseband representation of the second modulated signal 104. The desired and undesired component estimators 109 and 111, respectively, estimate the desired and undesired components of the second modulated signal 104 as discussed with reference to FIG. 1. The desired and undesired component estimators 109, 111 provide their respective estimates 210, 212 to the processor 213, which in turn calculates a second ratio based on the estimates 210, 212 to identify the signal usability of the second modulated signal 104. Provided the estimates 210, 212 are accurate, the second ratio approximates the ratio of the second desired component to the second undesired component ($C_2/I_2$). Since the fading encountered by the second modulated signal 104 is generally different than the fading encountered by the first modulated signal 102, the second ratio is most often unequivalent to the first ratio.

Upon determining the first and second ratios, the processor 213 uses these ratios to determine signal weightings. The signal weightings are subsequently used by a usable signal producer 215 to produce a usable signal 220. The signal weightings may be binary in nature, such that one of the two stored modulated signals 217-218 is selected (i.e., weighted by one) and the other is excluded (i.e., weighted by zero). Alternatively, the signal weightings may be a fractional mapping to the first and second ratios. In this case, the higher of the two ratios receives a signal weighting closer to one. Further, the signal weightings may provide a simple unity weighting for each stored modulated signal 217-218.

Regardless of the type of signal weightings, the usable signal producer 215 produces the usable signal 220 based on the signal weightings and the stored first and second modulated signals 217-218. The usable signal producer 215 preferably comprises a DSP, or microprocessor, that weights the stored modulated signals 217-218 by their respective weightings and produces the usable signal 220 based on the weighted modulated signals. In a preferred embodiment, the usable signal producer 215 includes a summer that sums the weighted first modulated signal with the weighted second modulated signal to produce the usable signal 220.

The present invention provides a method and apparatus for producing a usable signal from diverse modulated signals received by a diversity receiver. With this invention the usable signal is produced based on a ratio of the received signals' desired and undesired components (i.e., C/I) rather than their summation as in an RSSI measurement of the prior art. Thus, with the method of the present invention, a received signal with a high level of interference and noise is distinguished from a received signal with a low level of interference and noise. In contrast, an RSSI measurement cannot accurately distinguish signals with high levels of interference and noise. Further, when the gain in one transmit signal path is less than another, for example, due to antenna shadowing, an RSSI measurement for the lower gain signal path is often smaller than the RSSI measurement for the other signal path. Therefore, prior art methodology selects the higher gain signal as the better quality signal rather than selecting the signal from the path with less interference and noise. The present invention circumvents signal path gain and relies on the level of interference and noise, as compared to the level of the desired signal component, to produce the usable signal.

What is claimed is:

1. In a diversity receiver that receives diverse modulated signals, a method for using the diverse modulated signals to produce a usable signal, the method comprises the steps of:

a) receiving a first modulated signal, wherein the first modulated signal includes a first information portion, a first fading portion and a first undesired component;

b) alternately receiving a second modulated signal, wherein the second modulated signal includes a second information portion, a second fading portion and a second undesired component;

c) calculating a product of an estimate of the first information portion and an estimate of the first fading portion, and alternately calculating a product of an estimate of the second information portion and an estimate of the second fading portion, to produce an estimated first desired component and an estimated second desired component;

d) estimating the first undesired component and alternately estimating the second undesired component to produce an estimated first undesired component and an estimated second undesired component;

e) producing the usable signal, which step of producing comprises the steps of:

e1) calculating a first ratio using the estimated first desired component and the estimated first undesired component;

e2) calculating a second ratio using the estimated second desired component and the estimated second undesired component; and e3) weighting the first modulated signal based on the first ratio to produce a weighted first modulated signal; and e4) weighting the second modulated signal based on the second ratio to produce a weighted second modulated signal.

2. The method of claim 1, further comprising the step of:

i) summing the weighted first modulated signal and the weighted second modulated signal to produce the usable signal.

3. A diversity receiver that receives time diverse modulated signals, the diversity receiver comprising:

receiving means for alternately receiving a first modulated signal and a second modulated signal, wherein a first received modulated signal includes a first information portion, a first fading portion, and a first undesired component and wherein a second received modulated signal includes a information portion, a second fading portion, and a second undesired component;

signal memory means for storing at least the first received modulated signal;

a desired component estimator, operably coupled to the receiving means, wherein the desired component estimator alternately calculates an estimate of the first information portion and the first fading portion, and an estimate of the second information portion and the second fading portion to produce an estimated first desired component and an estimated second desired component;

an undesired component estimator, operably coupled to the receiving means, wherein the undesired component estimator alternately estimates the first undesired component and the second undesired component to produce an estimated first undesired component and an estimated second undesired component;

a processor, operably coupled to the desired component estimator and the undesired component estimator, wherein the processor calculates a first ratio based on the estimated first desired component and the estimated first undesired component, calculates a second ratio based on the estimated second desired component and the estimated second undesired component, and weights the first modulated signal and the second modulated signal based on the first ratio and the second ratio to produce a weighted first modulated signal and a weighted second modulated signal; and a usable signal producer, operably coupled to the processor and the signal memory means, wherein the usable signal producer produces a usable signal based on the weighted first modulated signal and the weighted second modulated signal.

4. The diversity receiver of claim 3, wherein the usable signal producer comprises a summer that sums the weighted first modulated signal and the weighted second modulated signal to produce the usable signal.

5. A diversity receiver that receives spatially diverse modulated signals, the diversity receiver comprising:

at least two spatially separated antennas, wherein the at least two spatially separated antennas alternately receive a first modulated signal and a second modulated signal, wherein the first modulated signal includes a first fading portion, a first information portion and a first undesired component, and wherein the second modulated signal includes a second desired component and a second undesired component;

desired component estimator means, operably coupled to the at least two spatially separated antennas, for calculating a product of an estimate of the first information portion and an estimate of the first fading portion to produce an estimated first desired component, wherein the desired component estimator alternately estimates the second desired component to produce an estimated second desired component;

undesired component estimator means, operably coupled to the at least two spatially separated antennas, for estimating the first undesired component and the second undesired component to produce an estimated first undesired component and an estimated second undesired component;

a processor, operably coupled to the desired component estimator means and the undesired component estimator means, wherein the processor calculates a first ratio based on the estimated first desired component and the estimated first undesired component and a second ratio based on the estimated second desired component and the estimated second undesired component; and switching means, operably coupled to the at least two Spatially separated antennas and the processor, for switching between the at least two antennas based on the first ratio and the second ratio to produce a usable signal that is a selected one of the first modulated signal and the second modulated signal.

6. The diversity receiver of claim 5, wherein the second desired component includes a second fading portion and a second information portion, and wherein the estimated second desired component comprises a product of an estimate of the second information portion and an estimate of the second fading portion.

7. The diversity receiver of claim 5, wherein the second desired component includes a second fading portion and a second information portion, and wherein the estimated second desired component comprises an average of a magnitude squared of a product of an estimate of the second information portion and an estimate of the second fading portion.

* * * * *